United States Patent [19]

Higashida

[11] 4,106,724

[45] Aug. 15, 1978

[54] TAPE CASSETTE

[75] Inventor: Yutaka Higashida, Nishinomiya, Japan

[73] Assignee: Matsushita Electric Industrial Co., Ltd., Osaka, Japan

[21] Appl. No.: 791,776

[22] Filed: Apr. 28, 1977

[30] Foreign Application Priority Data

May 4, 1976 [JP] Japan .............................. 51-56270[U]

[51] Int. Cl.² ............................................. G11B 23/10
[52] U.S. Cl. ................................................... 242/198
[58] Field of Search ............... 242/198, 199, 200, 197; 360/96, 93, 132

[56] References Cited

U.S. PATENT DOCUMENTS

| | | | |
|---|---|---|---|
| 3,059,871 | 10/1962 | Loewe | 242/198 |
| 3,227,387 | 1/1966 | Laa et al. | 242/198 |
| 3,672,603 | 6/1972 | Swain | 242/198 |
| 3,684,295 | 8/1972 | Strain et al. | 242/198 |
| 4,022,401 | 5/1977 | Kishi | 242/198 |

Primary Examiner—George F. Mautz
Attorney, Agent, or Firm—Stevens, Davis, Miller & Mosher

[57] ABSTRACT

A tape cassette is provided which accommodates tape reels wound with a tape such as a magnetic tape, wherein a braking means for stopping the rotational movement of the tape reels in time of non-use has such a construction that braking is released by a pin which is inserted through a hole formed in the bottom surface of the tape cassette when the cassette is prepared for play back or recording operation.

3 Claims, 4 Drawing Figures

TAPE CASSETTE

The invention relates to a tape cassette accommodating reels wound with a tape such as a magnetic tape, which is so constructed that unnecessary rotation and movement of the tape reels is stopped when the tape reels are not mounted on the magnetic recording-reproducing means whereby slack tape in the cassette is prevented.

Usually, in a magnetic recording-reproducing means using a tape cassette, the tape cassette is inserted into a cassette holding yoke. Then, either the holding yoke is moved towards the reel driving shaft, or the reel driving shaft is moved towards the holding yoke, so that an engagement between the tape reel and reel driving shaft may be effected.

According to this invention, use is made of a relative movement between the cassette holding yoke and the reel driving shaft. The function of the brake means in the cassette is automatically released just before the reel driving shaft and the tape reel are engaged with each other as a result of said relative movement. Then, the tape reels can make a rotational movement freely.

According to the inventive construction, since the brake release action is effected by a relative movement between the reel driving shaft and the cassette holding yoke, no restriction exists on the direction of inserting the cassette into the cassette holding yoke.

Detail explanation of embodiments will be made hereinafter with reference to accompanying drawings, in which.

Figure 1:
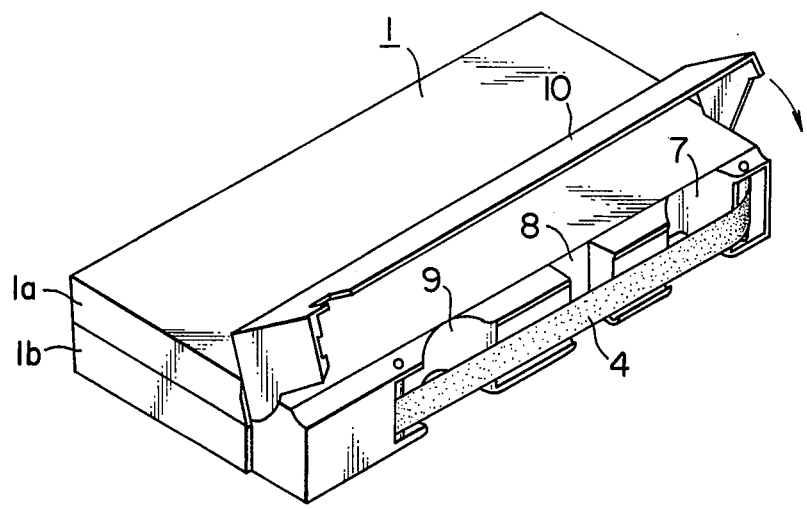
FIG. 1 is a perspective outer view of one embodiment of this invention.

In these figures, 1 denotes a cassette body which, like a conventional tape cassette of the same kind, can be divided into an upper half body 1a and a lower half body 1b. These two half bodies constitute a case.

The tape cassette 1 accommodates a supply reel 2 and a tape-up reel 3 which can make a rotational movement. A magnetic tape 4 from the supply reel 2 is led to the take-up reel 3 by way of guide posts 5 and 6. The tape is exposed in an opening on one side of the cassette body 1. In the opening, groove-cut portions 7 and 8 are provided, through which the tape is pulled out in the recording and reproducing time and abuts on a magnetic head. Also in the opening, another groove cut portion 9 is provided. The tape 4 extends across these groove cut portions 7, 8 and 9.

In time of nonuse, a cover 10 shuts the opening. In the recording and reproducing time, the cover 10 is removed as shown in FIG. 1 to expose the tape 4.

The above-mentioned construction is similar to that of the conventional tape cassette of this kind.

Next, characteristic parts of the inventive construction will be explained.

A multiplicity of teeth 11 and 12 are formed on the outer periphery of the lower flange of the both reels 2 and 3 with equal spacing. 14 denotes a projecting rib positioned between the reels 2 and 3 on the bottom surface 13 of the lower half body 1b. The rib has two parallel side walls 14a and 14b. 15 and 16 denote brake pieces with V shape which are placed rotatably with their centers on the shafts 17 and 18 respectively. These brake pieces are biased in the direction of arrows by the springs 19 and 20 respectively, the tip portions 15a and 16a being engaged with teeth 12 and 11 respectively to prevent any rotational movement of the reels to the direction of feeding the tape.

Figure 4:
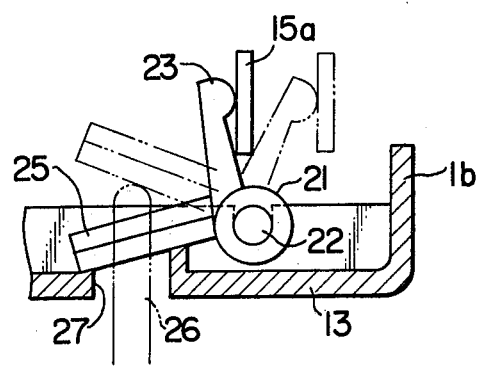
FIG. 4 is a side view for explanation of the main portions.

The interior of the cassette is so constructed that the other ends 15b and 16b of the brake pieces 15 and 16 are positioned between the both side walls 14a and 14b. The brake pieces ride over the walls 14a and 14b. Numeral 21 denotes a brake release member which can be rotated by a shaft 22 supported by the side walls 14a and 14b. Arms 23 and 24 are mounted on the brake release member 21, as shown in FIG. 4, so as to abut on the end portions of the brake pieces 15 and 16.

An action arm 25 is fixed on the brake release member 21 in order to close a hole 27 which is formed in the bottom plate 13 of the lower half case 16.

Next, the operation of the above construction will be explained.

Figure 2:
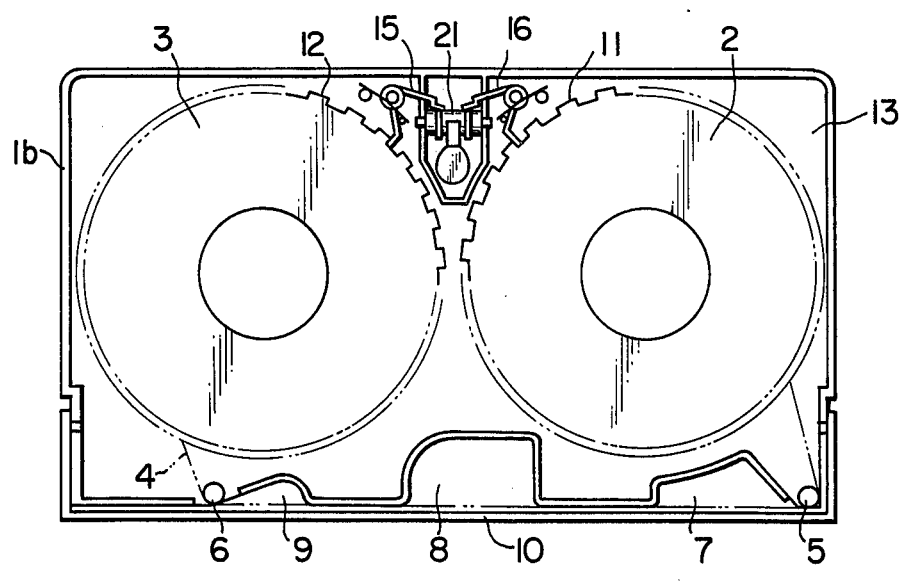
FIG. 2 is a top inner view of the embodiment.
Figure 3:
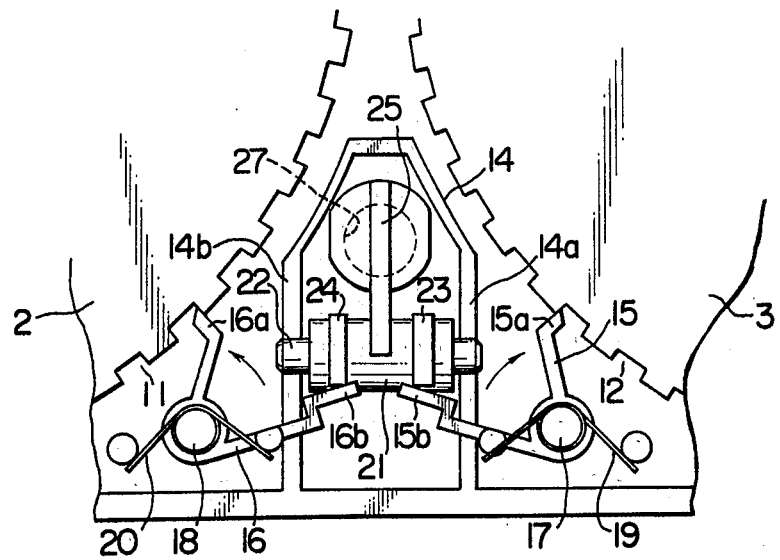
FIG. 3 is an enlarged view of the main portions of the embodiment.

In time of nonuse, the brake pieces 15 and 16 are engaged with the teeth 12 and 11 of the flange by the force of springs 19 and 20 respectively so that any rotational movement of the reels 3 and 2 to the direction of feeding the tape is prevented, as can be seen from FIGS. 2 and 3.

In time of use, the cassette is inserted into the cassette holding yoke, which is moved down to the reel driving shaft. Then, the brake release pin 26 provided in parallel with the driving shaft is inserted into the case through the plate 13, as shown in FIG. 4. As the pin 26 pushes the action arm 25, the brake release member 21 rotates.

In accordance with this rotation of the brake release member 21, the arms 23 and 24 cause a rotation of the brake pieces 15 and 16 against the force of springs 19 and 20, releasing the engagement of the brake pieces 15 and 16 with their flanges. Both reels can now rotate freely.

In this state, each reel driving shaft is inserted through a hole (not shown) into the case so as to be geared with the respective reel.

It is preferable to provide the tip of the brake release pin 26 so as to extend from the tip of the reel driving shaft. In accordance with this arrangement, that the brake release pin 26 is first inserted into the case and releases the above-mentioned braking engagement, following which the reel driving shaft is inserted into the case.

Furthermore, when the cassette is removed from the recording-reproducing means the springs 19 and 20 automatically restore the braking state, as shown in FIG. 3.

As described above, according to this invention, the brake pin which is inserted through the hole formed in the bottom surface of the cassette case is used to release the braking engagement of the reels. As a result, until the cassette is inserted into the cassette holder of the cassette recording and reproducing set and the holder is lowered to obtain an engagement between the reels in the cassette and the reel receiving mechanism provided in the set, no unnecessary slackness of the tape is brought about in the cassette because the reels continue to be in the braked state until they engage with the reel receiving mechanism. There is no limitation on the direction of inserting the cassette.

Further, the insertion of the release pin is effected from the bottom surface of the cassette which does not influence or disturb the tape feeding operation, etc.

Therefore, the hole for the brake release pin may be formed in the central portion of the tape cassette. This construction makes it possible to perform a simultaneous release of both reels.

What is claimed is:

1. A tape cassette for use in a magnetic recording and reproducing apparatus provided with a brake release pin located parallel to and near a pair of reel engaging shafts comprising:

a housing including a bottom plate;

first and second tape reels rotatably mounted in said housing in substantially the same plane which is parallel to said bottom plate, said first and second reels being spaced a predetermined distance apart and each having a flange portion and teeth provided on the periphery of said flange portion;

first and second brake pieces pivotably mounted in said housing and having respective tooth engaging end portions for respective removable engagement with the teeth of said first and second reels to prevent rotation thereof;

biasing means for pivotably biasing said first and second brake pieces into respective engagement with said teeth of said first and second reels;

a single through-hole formed in said bottom plate; and, a brake releasing means including an operating arm normally covering the entire area of said through-hole, said brake releasing means being pivotable by pushing pressure exerted on said operating arm by said brake release pin immediately prior to engagement of said shafts with said first and second reel, said brake releasing means further including a mechanism for engaging with said first and second brake pieces upon pivotal movement of said brake releasing means to pivot said brake pieces against the biasing force of said biasing means and away from respective engagement with said teeth on said first and second reels.

2. A tape cassette according to claim 1 wherein said mechanism comprises a pair of arms mounted on said brake release means and said brake release means rotates about an axis which is perpendicular to the pivot axis of said first and second brake pieces, said pair of arms engaging respectively with end portions of said first and second brake pieces opposite from said tooth engaging end portions.

3. A tape cassette according to claim 1 further comprising a rib projecting upwardly from said bottom plate which encloses an area of said bottom plate containing said through-hole.

* * * * *